US008479629B2

(12) United States Patent
Chiang

(10) Patent No.: US 8,479,629 B2
(45) Date of Patent: Jul. 9, 2013

(54) PAPER CUTTER

(76) Inventor: Tung-Lung Chiang, Yunlin County (TW)

( * ) Notice: Subject to any disclaimer, the term of this patent is extended or adjusted under 35 U.S.C. 154(b) by 458 days.

(21) Appl. No.: 12/802,554

(22) Filed: Jun. 9, 2010

(65) Prior Publication Data

US 2011/0303067 A1 Dec. 15, 2011

(51) Int. Cl.
*B23D 17/08* (2006.01)

(52) U.S. Cl.
USPC .................. 83/646; 83/633; 83/634; 83/614; 83/608

(58) Field of Classification Search
USPC .................. 83/605–614, 455, 633, 634, 636, 83/582, 584, 646; 412/16; 411/534, 338
See application file for complete search history.

(56) References Cited

U.S. PATENT DOCUMENTS

| | | | | | |
|---|---|---|---|---|---|
| 65,095 | A | * | 5/1867 | Lee | 241/270 |
| 72,709 | A | * | 12/1867 | Williams | 83/468.7 |
| 101,220 | A | * | 3/1870 | Booth | 83/608 |
| 139,373 | A | * | 5/1873 | Deane | 83/608 |
| 887,236 | A | * | 5/1908 | Dunbar | 83/609 |
| 1,274,551 | A | * | 8/1918 | Hoyt | 83/646 |
| 1,288,858 | A | * | 12/1918 | Fegley et al. | 83/647.5 |
| 1,307,552 | A | * | 6/1919 | Johnson | 83/646 |
| 1,368,473 | A | * | 2/1921 | Beatty | 411/534 |
| 1,864,830 | A | * | 6/1932 | Johnson | 83/584 |
| 2,254,374 | A | * | 9/1941 | Laukhuff | 83/387 |
| 2,779,409 | A | * | 1/1957 | Becker | 83/584 |
| 3,740,848 | A | * | 6/1973 | Lindley | 30/319 |
| RE31,674 | E | * | 9/1984 | Wozniak et al. | 83/605 |
| 5,044,243 | A | * | 9/1991 | Aizawa | 83/558 |
| 5,370,027 | A | * | 12/1994 | Mathian | 83/527 |
| D386,663 | S | * | 11/1997 | Kehres et al. | D8/51 |
| 2002/0007713 | A1 | * | 1/2002 | Lee | 83/607 |
| 2004/0007108 | A1 | * | 1/2004 | Fregeolle et al. | 83/13 |
| 2009/0126546 | A1 | * | 5/2009 | Chiang | 83/614 |
| 2011/0048208 | A1 | * | 3/2011 | Davies et al. | 83/633 |
| 2011/0214549 | A1 | * | 9/2011 | Shih | 83/606 |

FOREIGN PATENT DOCUMENTS

GB 2420734 A * 6/2006

* cited by examiner

*Primary Examiner* — Andrea Wellington
*Assistant Examiner* — Brendan Ayer
(74) *Attorney, Agent, or Firm* — Charles E. Baxley

(57) ABSTRACT

A paper cutter includes a base having a stationary blade; a fixing seat fixed to the base adjacent to one end of the stationary blade and having a connecting portion extending upward from the base, wherein the connecting portion is atop, peripherally formed with a plurality of teeth, and is formed centrally with a through hole for allowing a shaft to pass therethrough; a connecting element having a rotatory portion that is formed with a slot for allowing the shaft to pass therethrough and being atop provided with recesses for receiving the teeth; and a movable blade having a lower edge formed as a curved edge and having a front end fixed to the rotatory portion. Thereby, when the movable blade is pushed downward, the connecting element is driven to rotate and move along the teeth while approaching and sliding with respect to the stationary blade.

5 Claims, 6 Drawing Sheets

PAPER CUTTER

BACKGROUND OF THE INVENTION

1. Technical Field

The present invention relates to paper cutters, and more particularly, to a paper cutter which has a movable blade formed with a curved edge and slightly slides frontward during cutting, so as to perform smooth cutting operation.

2. Description of Related Art

Paper cutters have become an important stationery item wherever paperwork is performed, such as offices, households and small-scale retailers.

A conventional paper cutter includes a base attached laterally with a stationary blade and a movable blade pivotally connected to the base corresponding to the stationary blade, wherein the movable blade typically has a flat lower edge. In operation, the movable blade is pushed toward the stationary blade, so that the flat edge of the movable blade works together with the stationary blade to cut an article, such as a piece of paper, placed on the base.

The conventional paper cutter cuts paper on the strength of squeezing and pressing force between the stationary blade and the movable blade pivoting against the base. Therefore, a relatively great cutting force is presented near the joint of the movable blade and the base while a site far from the joint can only receive a relatively small cutting force. Thus, the conventional paper cutter may be competent for cutting paper of small thickness yet tends to fail to sharply cut paper of large thickness.

In addition, since there is merely a single spring existing between the movable blade and the base for propping up the movable blade, when the movable blade is pushed downward, the movable blade is likely to move bias toward either side. Consequently, the cutting operation performed by the movable blade and the stationary blade tends to be unsmooth and unstable and the cutting efficiency as well as the cutting quality can be adversely affected.

SUMMARY OF THE INVENTION

In view of the above-mentioned shortcomings, the present invention herein provides a paper cutter. The paper cutter includes a base having a stationary blade attached to a lateral thereof; a fixing seat fixed to the base adjacent to one end of the stationary blade and having a connecting portion extending upward from the base, wherein the connecting portion is atop, peripherally formed with a plurality of teeth, and is formed centrally with a through hole for allowing a shaft to pass therethrough; a connecting element having a rotatory portion that is formed with a slot for allowing the shaft to pass therethrough and being atop provided with recesses for receiving the teeth; and a movable blade having a lower edge formed as a curved edge and having a front end fixed to the rotatory portion and separate from the fixing seat by the rotatory portion. Thereby, when the movable blade is pushed downward, the connecting element is driven to rotate and move along the teeth while approaching and sliding with respect to the stationary blade.

One objective of the present invention is to provide the paper cutter, which is provided with the curved edge of the movable blade and enables the removable combination between the recesses and the teeth that allows the connecting element to rotate against the fixing seat smoothly, so that the movable blade, when pushed downward, slightly slides frontward so as to make cutting operation effort saving and smooth.

Another objective of the present invention is to provide the paper cutter, wherein the bush piercing into the slot rolls along the slot with the rotating rotatory portion and the balls of the washer between the bush and the fixing seat help to minimize friction when the movable blade rotates with the rotatory portion, so as to make cutting operation effort saving smooth.

Another objective of the present invention is to provide the paper cutter, wherein the combination of the pressing plate and the elastic pressing plate provides a normal pressing force to the movable blade so as to ensure close contact between the movable blade and the stationary blade, thereby improving cutting quality.

BRIEF DESCRIPTION OF THE DRAWINGS

The invention as well as a preferred mode of use, further objectives and advantages thereof will be best understood by reference to the following detailed description of an illustrative embodiment when acquired in conjunction with the accompanying drawings, wherein.

DETAILED DESCRIPTION OF THE INVENTION

Figure 1:
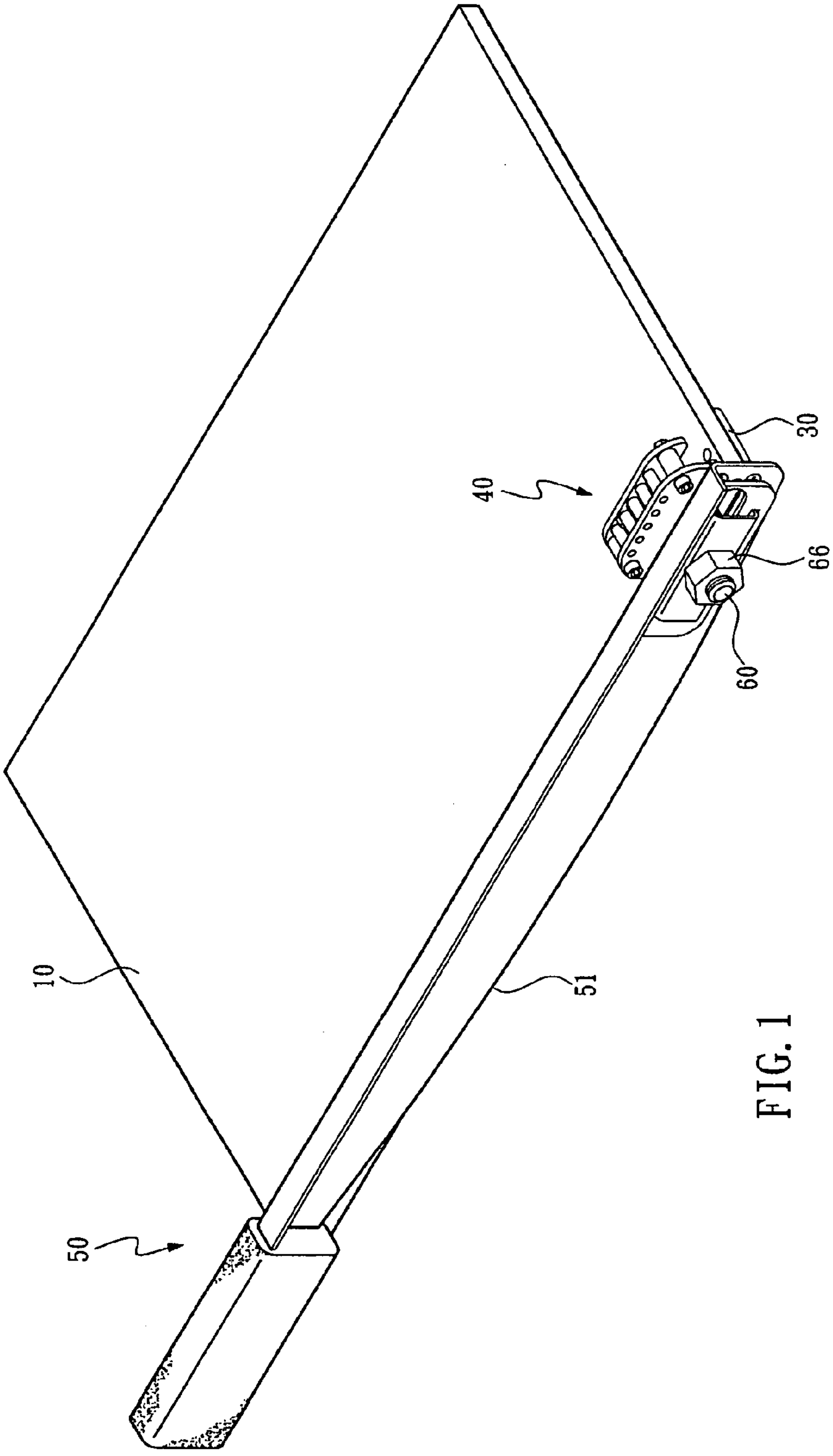
FIG. 1 is a perspective view of the present invention.
Figure 2:
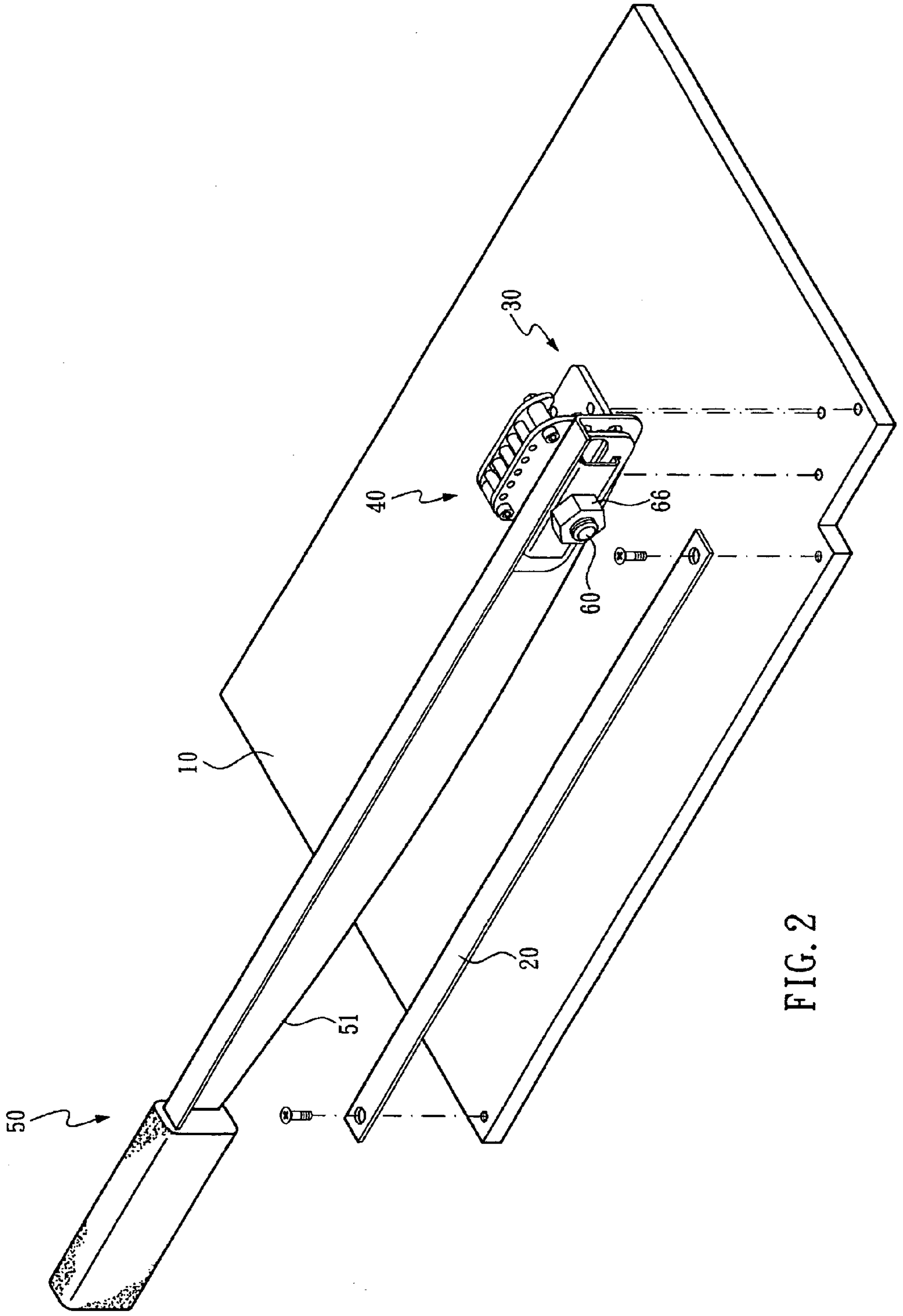
FIG. 2 is an exploded view of the present invention.
Figure 3:
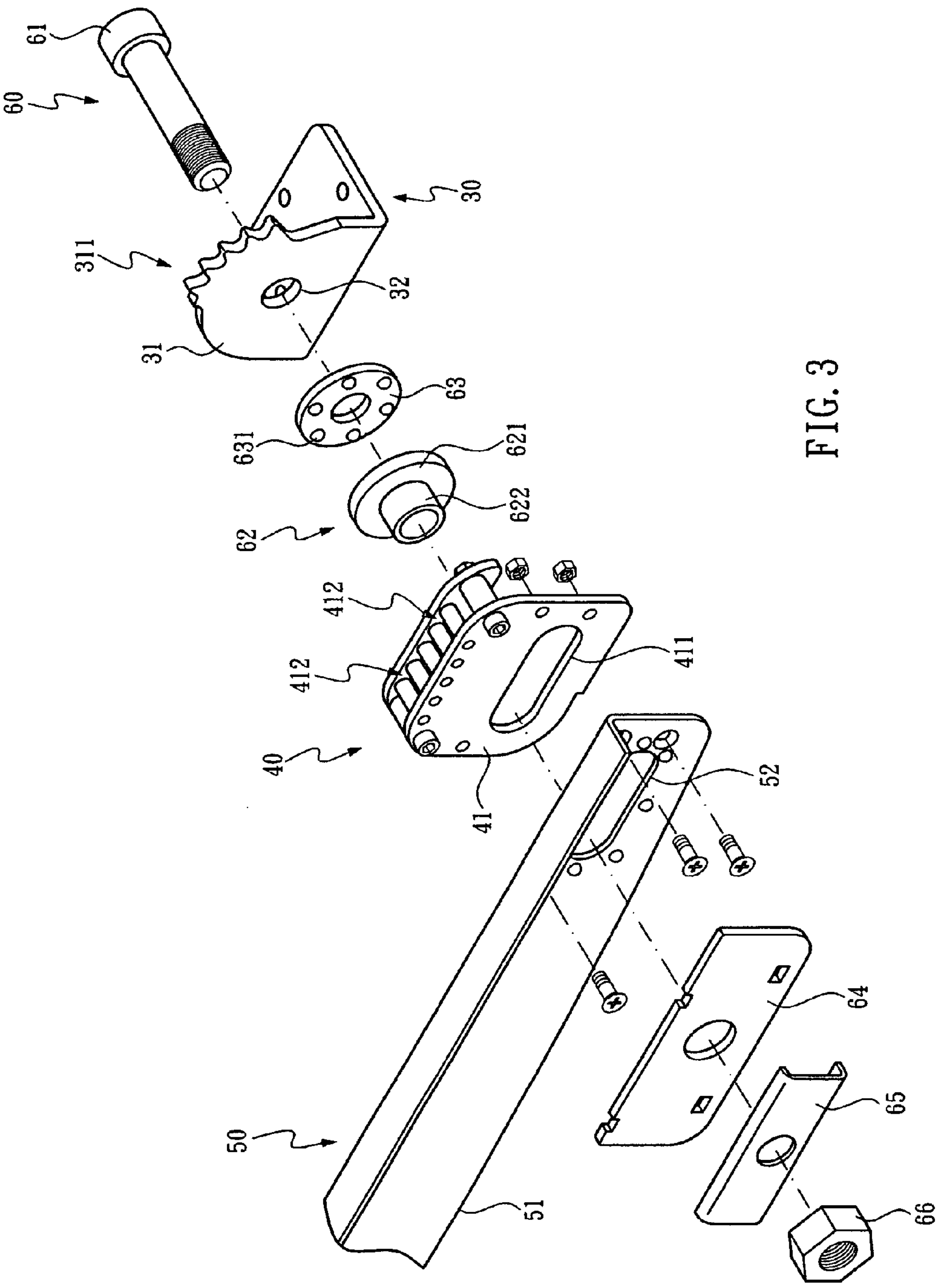
FIG. 3 is a partially exploded view of the present invention.
Figure 4:
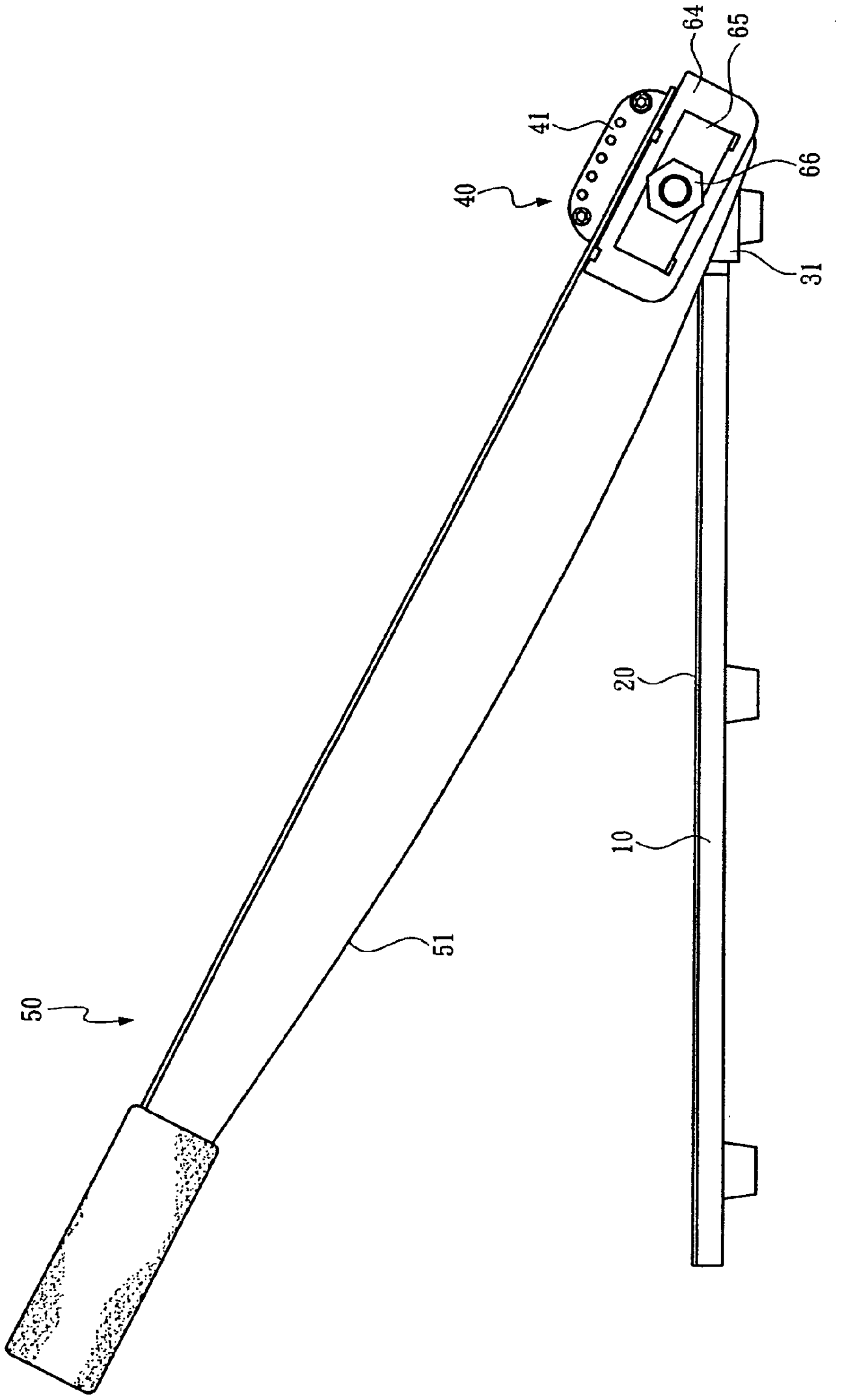
FIG. 4 is a profile of the present invention.

As shown in FIG. 1 through FIG. 4, the present invention is a paper cutter primarily comprising a base 10, a stationary blade 20, a fixing seat 30, a connecting element 40, and a movable blade 50.

The base 10 is a platform on which an article to be cut is placed, such as a piece of paper, a plastic slide or a thin textile sheet. The stationary blade 20 is fixed to a lateral of the base 10.

The fixing seat 30 is fixed to the base 10 adjacent to one end of the stationary blade 20. The fixing seat 30 has a connecting portion 31 extending upward from the base 10 so the fixing seat 30 is substantially L-shaped. The connecting portion 31 is atop, peripherally formed with a plurality of teeth 311 and centrally formed with a through hole 32 for allowing a shaft 60 to pass therethrough. The shaft 60 has one end formed with a retaining portion 61.

The connecting element 40 has a rotatory portion 41, which is formed with a slot 411 through which the shaft 60 can pass. The retaining portion 61 is retained at a side of the through hole 32 and separated from the connecting element 40 by the connecting portion 31 of the fixing seat 30. The rotatory portion 41 is atop provided with a plurality of recesses 412 for receiving the teeth 311 when the connecting element 40 is mounted on the connecting portion 31. A bush 62 is mounted around the shaft 60 corresponding to the slot 411. The bush 62 has a retaining flange 621 and a sleeve 622 raised from the retaining flange 621. The retaining flange 621 is sandwiched between the fixing seat 30 and the connecting element 40, while the sleeve 622 pierces into the slot 411. The sleeve 622 has a diameter slightly smaller than a width of the slot 411, so the bush 62 rolls in the slot 411 along with rotation of the rotatory portion 41. A washer 63 is mounted around the shaft 60 between the bush 62 and the fixing seat 30, and peripherally distributed with a plurality of balls 631.

The movable blade 50 has a lower edge formed as a curved edge 51, whose front end is formed with a connecting hole 52 for allowing the shaft 60 to pass therethrough. The movable blade 50 has a side contacting a side of the rotatory portion 41 and separated from the fixing seat 30 by the rotatory portion 41.

A pressing plate 64 and an elastic pressing plate 65 are mounted successively around the shaft 60 and separated from the connecting element 40 by the movable blade 50. A fastener 66 is coupled with the shaft 60 while being separated from the pressing plate 64 by the elastic pressing plate 65. The elastic pressing plate 65 has elasticity such that when the fastener 66 is fastened tightly to a lateral of the elastic pressing plate 65, the elastic pressing plate 65 is pushed by the fastener 66 to in turn press the pressing plate 64, which thus provides a normal pressing force to the movable blade 50. When the movable blade 50 is pushed downward, the normal pressing force helps to ensure close contact between the movable blade 50 and the stationary blade 20.

Figure 5:
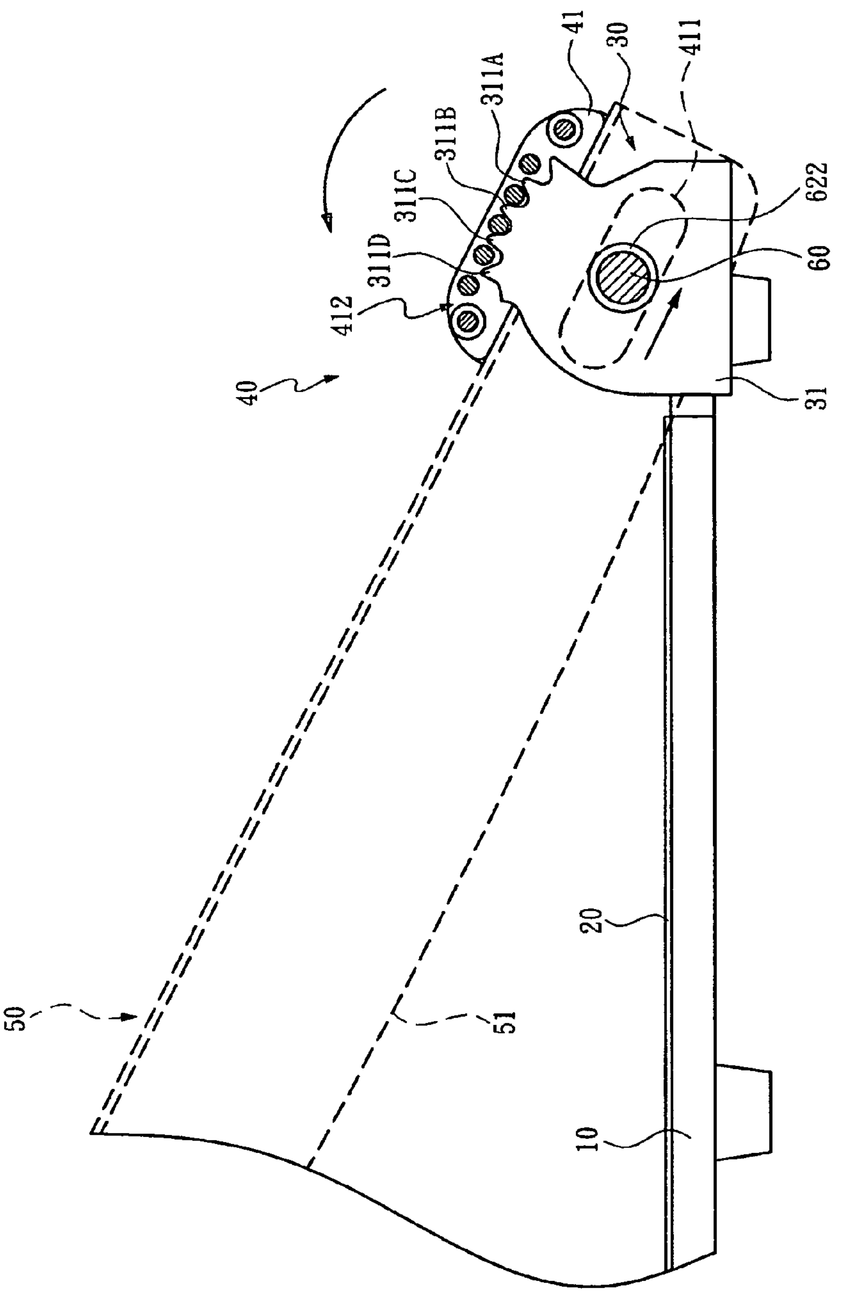
FIGS. 5 and 6 illustrate statuses of operation of the present invention.

In operation, as shown in FIG. 5, the movable blade 50, when prepared to make cutting, is lift and tilted with respect to the base 10. Therefore, the connecting element 40 leans frontward and at this time the several middle teeth 311 (311A, 311B and 311C as indicated in FIG. 5) on the connecting portion 31 are received in the corresponding recesses 412, while the sleeve 622 is positioned at a front end of the slot 411.

Figure 6:
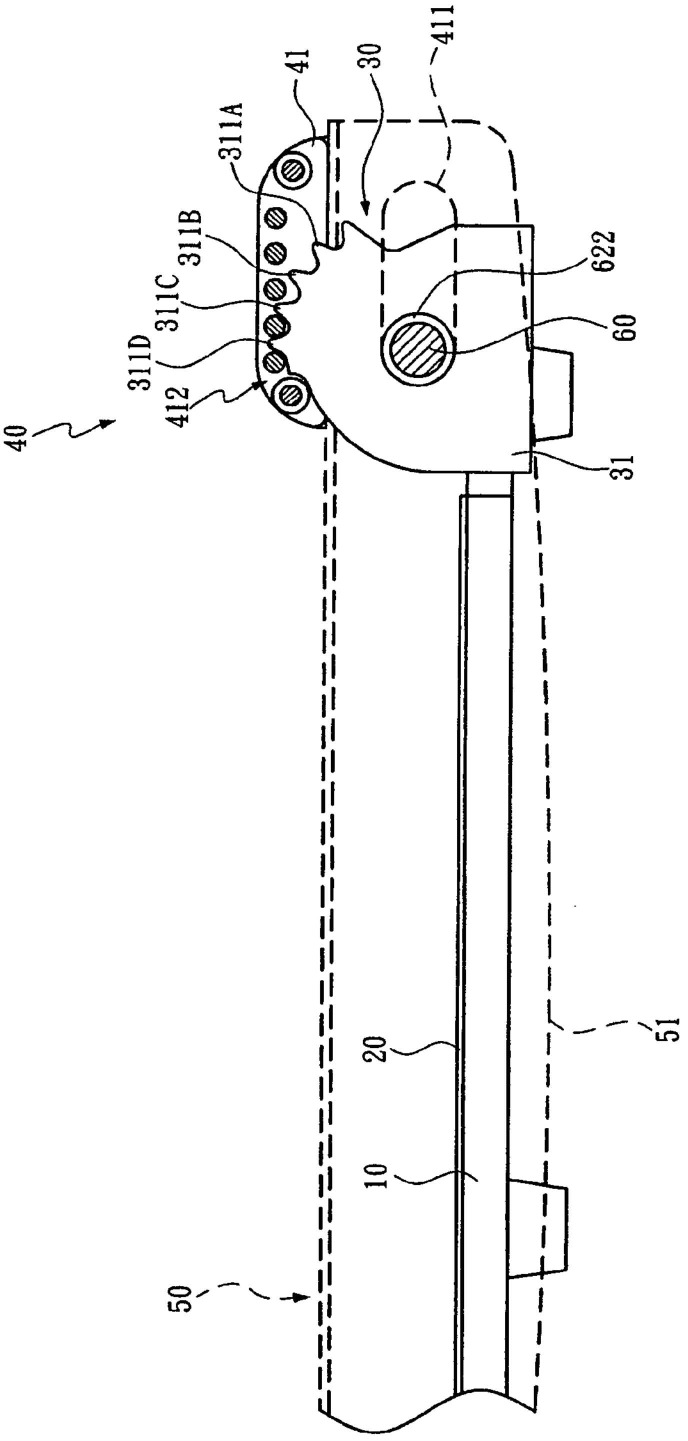

Referring to FIG. 5 and FIG. 6, when the movable blade 50 is pushed downward, the connecting element 40 is driven to rotate with the movable blade 50, so the sleeve 622 rolls along the slot 411. The balls 631 of the washer 63 facilitate minimizing friction between the rolling retaining flange 621 and the fixing seat 30, so as to allow the movable blade 50 to move the rotatory portion 41 more smoothly.

When the connecting element 40 is rotating, the middle teeth 311A, 311B and 311C of the connecting portion 31 that have been received in the recesses 412 are driven to successively leave the recesses 412, and then the teeth 311 (311C and 311D as indicated in FIG. 5) at a rear portion of the connecting portion 31 come to be received in the corresponding recesses 412. Meantime, the connecting element 40 drives the movable blade 50 to slide frontward, making the sleeve 622 roll in the slot 411. When the movable blade 50 and the stationary blade 20 finally become abreast to each other, the movable blade 50 and the connecting element 40 are parallel and the sleeve 622 is now positioned at a rear end of the slot 411, thus accomplishing an operational cycle. Then the movable blade 50 can be lift again for the next cutting task.

Thereby, taking advantage of the curved edge 51 of the movable blade 50, together with the removable combination between the recesses 412 and the teeth 311 that allows the connecting element 40 to rotate against the fixing seat 30 smoothly, the movable blade 50, when pushed downward, slightly slides frontward so as to make cutting operation effort saving and smooth.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A paper cutter, comprising:
- a base having a stationary blade attached to a lateral thereof;
- a fixing seat fixed to the base adjacent to one end of the stationary blade and having a connecting portion extending upward from the base, wherein the connecting portion is atop, peripherally formed with a plurality of teeth, and is formed centrally with a through hole for allowing a shaft to pass therethrough;
- a connecting element having a rotatory portion that is formed with a slot for allowing the shaft to pass therethrough and being atop provided with a plurality of recesses for receiving teeth; and
- a movable blade having a lower edge formed as a curved edge and having a front end contacting a side of the rotatory portion and separated from the fixing seat by the rotatory portion,
- wherein a pressing plate and an elastic pressing plate are mounted successively around the shaft and separated from the connecting element by the movable blade while a fastener is coupled with the shaft to abut against the elastic pressing plate so as to normally force the movable blade to contact the stationary blade closely,
- whereby when the movable blade is pushed downward, the connecting element is driven to rotate and move along the teeth while approaching and sliding with respect to the stationary blade.

2. The paper cutter of claim 1, wherein a bush is mounted around the shaft and has a retaining flange and a sleeve raised from the retaining flange, the retaining flange being sandwiched between the fixing seat and the connecting element, and the sleeve piercing into the slot so that the bush is allowed to roll in the slot with the rotating rotatory portion.

3. The paper cutter of claim 2, wherein the sleeve has a diameter smaller than a width of the slot.

4. The paper cutter of claim 2, wherein a washer is mounted around the shaft between the bush and the fixing seat, and peripherally distributed with a plurality of balls for facilitating minimizing friction when the movable blade rotates with the rotatory portion.

5. The paper cutter of claim 1, wherein the shaft has an end opposite to the fastener formed with a retaining portion for being retained at the through hole and separated from the connecting element by the connecting portion of the fixing seat.

* * * * *